United States Patent

Mahan et al.

[11] 3,875,498
[45] Apr. 1, 1975

[54] METAL DETECTOR FOR DISTINGUISHING BETWEEN PRECIOUS METAL OBJECTS AND OTHER METAL OBJECTS

[75] Inventors: William A. Mahan, Dallas; Lester A. Williams, Garland, both of Tex.

[73] Assignee: D-Tex Electronics, Garland, Tex.

[22] Filed: Sept. 20, 1973

[21] Appl. No.: 399,444

[52] U.S. Cl.................................. 324/3, 331/40
[51] Int. Cl............................................ G01v 3/10
[58] Field of Search............. 324/3, 67, 41; 331/37, 331/40, 65

[56] References Cited
UNITED STATES PATENTS
3,467,855  9/1969  Rance.................................. 324/3

OTHER PUBLICATIONS
Metal Detector, Electronic Circuits Manual, McGraw Hill, 1971, p. 420.
Osborne, W. E.; Transistorized Metal Detector, Electronics World, March 1962, pp. 86–88.
Green, Charles; Gold Grabber, Radio-TV Experimenter, Aug.–Sept. 1968, pp. 41–44.
Bohr, Edwin; Two Transistorized Metal Locators, Radio–Electronics, Mar. 1955, pp. 54–57.

*Primary Examiner*—Gerard R. Strecker
*Attorney, Agent, or Firm*—Peter J. Murphy; Cecil L. Wood

[57] ABSTRACT

The circuit for a portable metal detector includes a search coil oscillator which includes the search coil in the foot or probe of the detector and a tunable reference oscillator, with the oscillators being connected in a differential circuit whereby the difference or beat frequency of the oscillators is detected and amplified, with corresponding signals being fed to audio devices and to a milliammeter. The circuit provides for a shift in relative phase angle between the oscillators when the reference oscillator is tuned to a frequency below that of the search coil oscillator. When the field of the search coil approaches a ferrous object, the phase angle shifts in one direction to produce one type of change in the aural and meter signals; and when the search coil field approaches a precious metal object, the relative phase angle of the two oscillators shifts in the other direction to produce a different type of change in the aural and meter signals.

7 Claims, 2 Drawing Figures

METAL DETECTOR FOR DISTINGUISHING BETWEEN PRECIOUS METAL OBJECTS AND OTHER METAL OBJECTS

BACKGROUND AND SUMMARY OF THE INVENTION

This invention relates to a portable metal detector and circuit providing both audio and visual signal means for distinguishing between precious metal objects and ferrous metal objects.

While portable metal detectors are used for many purposes, one popular use of such device is that of "coin shooting" which is a search for coins of precious metals such as gold or silver and other objects of precious metals such as jewelry. In many cases the practice of coin shooting involves the search of ground areas which have been heavily traveled by the public and as a result would contain much debris including metal objects in the form of bottle caps, cans and parts of cans, and objects made of metal foil.

An object of this invention is to provide an improved circuit for a metal detector which is designed for coin shooting or regular treasure hunting, or for any other purposes.

Another object of this invention is to provide an improved metal detector circuit which will distinguish between gold, silver and various other precious and non-ferrous metals on the one hand, and iron, "tin cans", aluminum beer cans and other types of trash on the other hand.

A further object of this invention is to provide an improved metal detector and circuit therefore which provides both aural and visual signals which discriminate between the detection of precious metal objects and objects of other types of metal.

Still another object of this invention is to provide an improved metal detector and circuit wherein the circuit can be adjusted to provide different types of response to the detection of different kinds and sizes of metal objects.

These objects are accomplished in a metal detector having an improved circuit as follows. A first transistor oscillator means includes a search inductor radiating radio frequency energy and adapted to be passed in proximity to an object to be detected. A second transistor oscillator is a reference oscillator; and the first and second oscillators each include a tank circuit tuned to a common resonant frequency. The transistors of the first and second oscillators are connected in a common base-bias resistive network; and the output electrodes of the transistors are connected to a common mixer network. The output of the mixer network is connected by means including a capacitor to the base-bias resistive network of a transistor detector means; and the base-bias resistive network of the detector is independent of the base-bias resistive network which is common to the oscillators. The output of the detector means is fed through audio amplifiers to separate transducers for producing aural and visual signals. The second or reference oscillator includes tuning means in the tank circuit for changing the phase angle of the second oscillator relative to the first oscillator for producing a difference signal output in the mixer network.

More particularly the first oscillator includes a variable resistor connected in parallel with the feedback capacitor providing a phase adjustment for the first oscillator.

The novel features and the advantages of the invention, as well as additional objects thereof, will be understood more fully from the following description when read in connection with the accompanying drawings.

DRAWINGS

FIG. 1 is a schematic circuit diagram of a preferred form of circuit for the metal detector of the invention; and FIG. 2 is a perspective diagrammatic illustration of a type of metal detector in which the circuit invention may be embodied.

DESCRIPTION OF THE PREFERRED EMBODIMENT

Figures 1, 2:
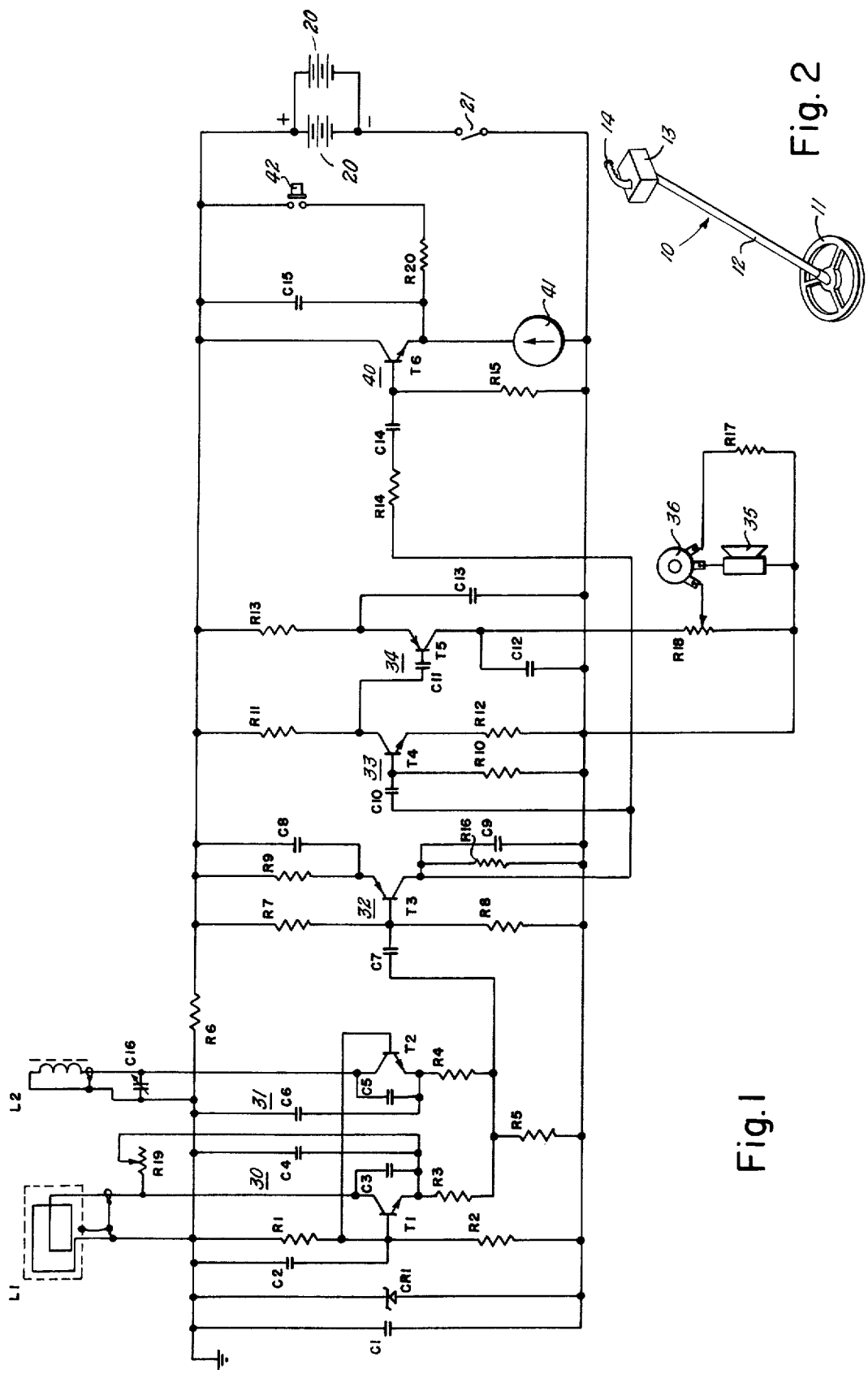

Referring first to FIG. 2 there is shown a portable metal detector 10 of the type in which the circuit of the present invention is used, including a search coil housing 11, an elongated support shaft 12 connecting the search coil housing to an upper housing 13 for the operating circuit and controls, and a support and manipulating handle 14 associated with the housing 13.

Referring to the schematic circuit diagram of FIG. 1 in general, the circuit is powered by two parallel connected 9 volt dry cell batteries 20, for example, and the circuit is energized to an on-off switch 21 connected in series with the batteries 20. The circuit includes a search coil oscillator 30 and a reference oscillator 31, with the search coil oscillator 30 including the search coil L1, to be described in detail subsequently and which is physically contained within the search coil housing 11. The oscillators 30 and 31 are connected in a differential type circuit with the oscillator outputs being fed to a detector-amplifier 32 which detects and amplifies the difference or beat frequency.

The output of detector-amplifier 32 is fed through audio-amplifier stages 33 and 34 to a loudspeaker 35 and a jack 36 to which a suitable audio headset may be connected. A potentiometer R18 functions as a volume control for the speaker and headset jack. The output of the detector-amplifier 32 is also fed through an amplifier 40 to a milliammeter 41 for visual observation of the output signal.

In the preferred form of circuit illustrated schematically in FIG. 1, the following values of components, presented by way of example, are suitable for accomplishing the objects of the invention:

CR1 1N755
C1 0.1 mF
C2 0.2 mF
C3-C5 5000pf Sprague Orange Drop 6 PSD 50
C4-C6 15000pf Sprague Orange Drop 6 PSS 15
C7 0.01 mF 10v
C8 15 mF 12 vdc
C9 0.1 mF 10v
C10 - 1 mF 12 vdc
C11 - 15 mF 12 vdc
C12 - 0.1 mF 10v
C13 - 100 mF 12 vdc
C14 - 0.1 mF 10v
C15 - 15 mF 12 vdc
R1 - R2 - R5 - R7 - R8 - 4.75K
R3 - R4 - R9 - 2.2K
R6 - 100 ohm
R10 - 22K
R12 - R13 - 150 ohm
R11 - R14 - R16 - 1K R15 - 2.7K
R17 - 100 ohm
R18 - 1K pot
R19 - 250 K pot
R20 - 9.1 K
T1 - T2 - TIS 92
T3 - T5 - GE 2N6009
T4 - T6 - GE 2N6008
35 Speaker - Quam 45 ohm
36 Jack (for 11 ohm headset)

The search coil oscillator 30 is a Colpitts type oscillator which includes transistor T1, search inductance coil L1 and capacitors C3 and C4 which provide a tank circuit having a resonant frequency of about 54 KHZ, with capacitor C3 being the feedback capacitor. The search coil L1 is preferably composed of 99 turns of No. 24 coated solid copper wire, having an inductance of about 2.33 millihenrys. The search coil is shielded by a Faraday shield composed of No. 22 coated solid copper wire which is grounded at one end with the other end floating. The search coil L1 is enclosed within the outer perimeter or rim of the search coil housing 11, which housing is sometimes referred to as a probe. The search coil oscillator generates its signal at its fundamental frequency at the emitter of transistor T1. The oscillator 30 includes a control feature provided by the variable resistor R19 connected in the parallel with the feedback capacitor C3 which is connected from the emitter to the collector of transistor T1. This control feature of the search coil oscillator will be referred to subsequently.

The reference oscillator 31 is a Colpitts type oscillator which includes transistor T2, and inductor coil L2 and capacitors C5, C6 and C16. The inductor coil L2 consists of 335 turns of No. 26 coated solid copper wire having an inductance of about 2.33 millihenrys. The inductor L2 includes a powdered iron core (DCR 2.21 5 percent). Coil L2 and capacitors C5, C6 and C16 provide a tank circuit having a resonant frequency of about 54 KHZ, with the capacitor C16 being variable for tuning the frequency of the reference oscillator 31 as will be described subsequently. Feedback capacitor C5 is connected between the emitter and collector of transistor T2. The reference oscillator 31 generates its fundamental frequency at the emitter of transistor T2.

The two oscillators 30 and 31 are connected in a differential circuit with the outputs being combined in a mixer network including resistors R3 and R4 and common resistor R5. A common base-bias network for the oscillator transistors T1 and T2 includes resistors R1 and R2.

The output from the mixer is fed by means of capacitor C7 into the base-bias resistive network for transistor T3 of the detector-amplifier 32, which detects the difference or beat frequency signal which is in the audio-frequency range.

The audio-frequency output signal from the detector-amplifier 32 is fed to the input of a first stage audio-amplifier 33 which includes the transistor T4. This amplifier 32 is normally quiescent; and the input signal is fed through a differentiating network consisting of the capacitor C10 and resistor R10 which serve to shape the input wave, that is to produce good high peaked pulses for instantaneous turning on and turning off of the amplifier 33. The second stage audioamplifier 34 consisting of the transistor T5 is also normally quiescent, and is turned on and off by the suitably shaped output pulses from the first stage amplifier. The output of the second stage amplifier 34 is fed through the variable resistor R18 which serves as the volume or gain control for either the loudspeaker 35, which is preferably a 45 ohm speaker, or the jack 36 for the headset, preferably an 11 ohm headset.

The audio-frequency output signal from the detector-amplifier 32 is also fed to amplifier 40 including the transistor T6. The amplifier 40 is also normally quiescent and the input signal is fed through a differentiating network consisting of the capacitor C14 and the resistor R15 to again provide good high peaked pulses for turning the amplifier on and off and to provide a sharp output signal for driving the milliammeter 41.

The metal detector circuit also includes a battery test circuit which consists of a normally open switch 42 which, when closed, connects the milliammeter 41 in series with the batteries 20 through a resistor R20. In operation, the circuit is turned on by means of switch 21; and, in one aspect of the operation, the search coil differential adjustment R19 is adjusted to a wide open or full oscillating condition of the search coil oscillator 31. With both oscillators tuned to the fundamental resonant frequency, namely 54 KHZ for the preferred circuit described, no different signal appears at the mixer, the output being the frequency of the oscillators in resonance. The reference oscillator is then tuned, by means of its tuning capacitor C16, to a frequency slightly below that of the search coil oscillator; and with an increase in the frequency of the difference signal, the relative phase angle of the two oscillators also increases. Due to the manner in which the two oscillators are related in the circuit, they tend to remain locked together until a certain phase angle difference is achieved; and it has been discovered, for the circuit parameters in the preferred circuit described, that at a relative phase angle of approximately 126.9° the oscillators unlock and a difference signal appears at the mixer. The tuning capacitor C16 is then further adjusted to produce a pleasant audio tone in the speaker or headset such as a tone in the range of 100 to 200 cycles for example. This audio output signal also produces a reading on the milliammeter 41 which is an intermediate reading on the meter dial.

With the disclosed unique arrangement of components, the detector circuit is peaked at such a point that when the search coil L1 approaches a small ferrous object, the resultant change of inductance of the search coil, due to the interference of coil field by the ferrous object, causes a phase shift in the search coil oscillator circuit which effects a reduction of the phase angle of the search coil oscillator relative to the reference oscillator. With the reduction in phase angle there is a related lowering of the audio output frequency and of the tone and visual meter indication.

When the search coil approaches a precious metal object, or objects of other non-ferrous metals such as brass or aluminum, the inductance of the search coil changes in a manner to cause a phase angle change in the search coil oscillator which results in an increase of the phase angle of the search coil oscillator relative to the reference oscillator. The related output signal change then is an increase in the tone and in the visual meter indication. In this manner, the detector discriminates both aurally and visually between precious metal objects on the one hand and ferrous metal objects on the other hand.

In another aspect of the operation, in order to make the detector more sensitive, the feedback of the search coil oscillator may be adjusted by means of the differential adjustment R19. This may be adjusted to shift the phase of the feedback signal to a point where the search coil oscillator is just barely oscillating, or in other words is very close to breaking out of oscillation. In this condition, when the field of the search coil is cut by small ferrous objects, the resulting shift in phase causes complete or almost complete cutoff of the search coil oscillator, which kills the mixer signal so that there is no detectable aural or visual signal from the metal detector. In this condition, when the search coil field is cut by objects such as precious metal objects, the relative phase angle of the oscillators increases as before, and there is aural and visual positive indication. With this feature of the detector circuit then, the metal detector can be made extremely sensitive to the detection of ferrous objects and also other objects as will be described.

Another interesting feature of the described detector circuit is its reaction to a relatively large object located in a plane parallel to the plane of the search coil; and this would include flat objects such as flatted cans buried slightly below the ground surface in the ground searching situation. When the search coil is moved into the area of such objects, a substantial portion of the inductive field is cut by the object and it appears that the change in inductance causes a rapid and extensive increase in the relative oscillator phase angle, such that the relative phase angle approaches 180° which places the oscillator outputs in approximate opposite phase, resulting of course in cancelling the mixer output and the aural and visual signals. It appears that the detector acts in this way, whether the relatively large object is of a ferrous or a non-ferrous material. In this manner then such relatively large objects are distinguished, by, the detector from both relatively small ferrous objects and relatively small objects of either precious metal or non-ferrous materials.

In the preferred form of circuit which has been described, and including components with the values as set out in the foregoing specification, particular circuit parameters are defined which make the above described functions possible. These parameters are as follows. The resonant frequency of both of the oscillator tanks is 54 KHZ. The special inductance of both oscillator tank coils L1 and L2 is 2.33 millihenrys. The search coil L1 is composed of 99 turns, which gives a Q which is favorable to the system; and the coil is covered by a torroidal-wound Faraday shield. The feedback ratio of each oscillator is 3 to 1. The mixer output signal is fed by means of a 0.01 microfarad capacitor which looks into the base-bias resistive network for the detector-amplifier transistor, which network consists of two 4.75K resistors; and the base-bias resistive network for the detector 32 which is the mixer load, is independent of the base bias resistive network for the oscillators 30 and 31. Another paramater, for the search coil oscillator phase adjustment, is that a variable resistor is connected in parallel with the feedback capacitor which is connected from the emitter to the collector of the oscillator transistor.

What has been described is a novel and unique circuit for a portable metal detector providing features whereby the detector will discriminate by means of both aural and visual signals to the user between small ferrous articles on the one hand and small articles of precious metals on the other hand. Another feature of the circuit is the means for increasing the sensitivity to enable detection of very small articles or articles remote from the plane of the search coil which could not otherwise be detected.

While the preferred embodiment of the invention has been illustrated and described, it will be understood by those skilled in the art that changes and modifications may be resorted to without departing from the spirit and scope of the invention.

What is claimed is:

1. A detector including
first transistor oscillator means including a search inductor radiating radio frequency energy and adapted to be passed in proximity to an object to be detected;
second transistor oscillator means;
said first and second oscillator means each including a tank circuit tuned to a common resonant radio frequency; the transistors of said first and second oscillators being connected in a common base bias resistive network, and the output electrodes thereof being connected to a common mixer network;
said first oscillator including a resonant tank circuit consisting of a parallel connected inductor and capacitor; said tank circuit capacitor including a feedback capacitor connected in parallel with said transistor between said transistor emitter and collector electrodes; a variable resistor connected in parallel with said feedback capacitor; and said feedback capacitor and variable resistor providing a phase adjustment for said first oscillator;
a transistor detector means including a base bias resistive network independent from the common base bias resistive network for said oscillators; means including a capacitor connecting the output of said mixer network to said detector means base bias resistive network;
means coupling the output of said detector means to a transducer to produce a corresponding aural signal;
means coupling the output of said detector means to a transducer for producing a corresponding visual signal; and tuning means connected in one oscillator tank circuit for changing the phase angle of said one oscillator relative to the other oscillator, whereby said first and second oscillators unlock to produce a difference frequency at the mixer.

2. A detector as set forth in claim 1
audio amplifier means connected between said detector means and said aural transducer; the output of said detector means being coupled to the input of said audio amplifier means through a differentiating network consisting of a series connected capacitor and a parallel connected resistor.

3. A detector as set forth in claim 1
audio amplifier means connected between said detector means and said visual transducer; the output of said detector means being coupled to the input of said audio amplifier means through a differentiating network consisting of a series connected capacitor and a parallel connected resistor.

4. A detector as set forth in claim 1
said second oscillator including a resonant tank circuit consisting of a parallel connected inductor and capacitor; said tank circuit capacitor including a feedback capacitor connected in parallel with said transistor between said transistor emitter and collector electrodes.

5. A detector as set forth in claim 4 a variable capacitor connected in parallel with said inductor of said second oscillator tank circuit, defining said tuning means.

6. A detector as set forth in claim 4 said capacitor for each oscillator tank circuit including a respective first capacitor and said respective feedback capacitor connected in series; and the respective capacitance of each said first capacitor and said feedback capacitor providing a feedback ratio of 3:1.

7. A detector as set forth in claim 6 said inductors for both oscillator resonant tank circuits having an inductance of 2.33 millihenrys, said first capacitors for both of said resonant tank circuits having a capacitance of 15,000 pf, and the resonant frequency for both oscillators being 54 KHZ; the feedback capacitors for both oscillators each having a capacitance of 5,000 pf, thereby defining feedback ratios of 3:1; and said inductor for said first oscillator resonant tank circuit having 99 turns.

* * * * *